(12) United States Patent
Behroozi et al.

(10) Patent No.: US 8,493,945 B2
(45) Date of Patent: Jul. 23, 2013

(54) CHARACTERIZING TRANSMISSION OF ACCESS NODES WITHIN A WIRELESS NETWORK

(75) Inventors: Peter Behroozi, Stanford, CA (US); Cyrus Behroozi, Menlo Park, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 1055 days.

(21) Appl. No.: 11/699,101

(22) Filed: Jan. 29, 2007

(65) Prior Publication Data

US 2008/0182607 A1    Jul. 31, 2008

(51) Int. Cl.
*H04W 4/00* (2009.01)
*H04W 24/00* (2009.01)
*H04B 7/00* (2006.01)

(52) U.S. Cl.
USPC .......................... 370/338; 370/310; 455/424

(58) Field of Classification Search
USPC ....................................................... 455/522
See application file for complete search history.

(56) References Cited

U.S. PATENT DOCUMENTS

| | | | |
|---|---|---|---|
| 6,707,862 B1 | 3/2004 | Larsson | |
| 6,735,420 B2 | 5/2004 | Vuong | |
| 6,879,840 B2 | 4/2005 | Razavilar et al. | |
| 7,082,107 B1 | 7/2006 | Arvelo | |
| 2006/0153081 A1* | 7/2006 | Simonsson et al. | 370/238 |
| 2006/0199545 A1* | 9/2006 | Abusch-Magder et al. | 455/67.11 |
| 2006/0211441 A1* | 9/2006 | Mese et al. | 455/522 |
| 2007/0047492 A1* | 3/2007 | Kim et al. | 370/331 |

OTHER PUBLICATIONS

Jung, Vaidya, "A Power Control MAC Protocol for Ad Hoc Networks", 2005, Wireless Networks 11, 55-66.
Narayanaswamy, Kawadia, Sreenivas, Kumar, "Power Control in Ad-Hoc Networks: Theory, Architecture, Algorithm and Implementation of the COMPOW Protocol", Department of Electrical and Computer Engineering, and Coordinated Science Laboratory University of Illinois.
Wattenhofer, Li, Bahl, Wang, "Distributed Topology Control for Power Efficient Operation in Multihop Wireless Ad Hoc Networks", 2001, IEEE INFOCOM.
Ramanathan et al. "Topology Control of Multihop Wireless Networks Using Transmit Power Adjustment" 2000, IEEE INFOCOM.

* cited by examiner

*Primary Examiner* — George Eng
*Assistant Examiner* — Inder Mehra
(74) *Attorney, Agent, or Firm* — Brian R. Short (57) ABSTRACT

A method of characterizing transmission of a node of a wireless network is disclosed. The method includes determining a neighbor function based on how many neighboring nodes are affected by a neighbor function based on how many neighboring nodes are affected by signals transmitted from the node at varying power levels. For a range of transmission path losses between the node and neighboring nodes, transmission power levels and transmission data rates are calculated that minimize an air-time metric, wherein the air-time metric is dependent on the neighbor function and an air-time occupied by transmission packets.

19 Claims, 7 Drawing Sheets

CHARACTERIZING TRANSMISSION OF ACCESS NODES WITHIN A WIRELESS NETWORK

FIELD OF THE INVENTION

The invention relates generally to wireless communications. More particularly, the invention relates to a method and apparatus for characterizing transmission power levels and data rates of access nodes within a mesh network.

BACKGROUND OF THE INVENTION

Packet networking is a form of data communication in which data packets are routed from a source device to a destination device. Packets can be networked directly between a source node and a destination node, or the packets can be relayed through a number of intermediate nodes.

In wireless networks, different transmission protocols (such as, 802.11) allow the transmission of information at different power levels and data rates. Depending upon the characteristics of the links between the access nodes, some power levels and data rates can be more desirable than others.

Increasing transmission power levels generally increases the probability of successful packet reception. However, within a wireless network, increasing the transmission power levels increases the probability of the transmission interfering with other wireless communication links, resulting in a reduction in available network-wide airtime and overall network capacity. Similarly, there are tradeoffs to operating a link at different transmit data rates. Increasing transmit rate (if the link supports it) can result in more efficient use of airtime, since it takes less time to transmit a bit. As a result, network capacity can be increased. However, higher data rates require a larger signal-to-noise ratio at the receiver for successful packet reception, and using a higher data rate may result in higher probability of packet loss, necessitating retransmissions.

It is desirable to determine and operate access nodes of a wireless mesh network at transmission power levels and transmission data rates that account for interference the transmission causes with wireless links of other access nodes of the wireless mesh network.

SUMMARY OF THE INVENTION

An embodiment of the invention includes a method of characterizing transmission of a node of a wireless network. The method includes determining a neighbor function based on how many neighboring nodes are affected by signals transmitted from the node at varying power levels. For a range of transmission path losses between the node and neighboring nodes, transmission power levels and transmission data rates are calculated that minimize an air-time metric, wherein the air-time metric is dependent on the neighbor function and an air-time occupied by transmission packets.

Another embodiment of the invention includes a method of setting transmission power levels and data rates of nodes within a wireless mesh network. The method includes determining a neighbor function based on how many neighboring nodes are affected by signals transmitted from the node at varying power levels. For a range of transmission path losses between the node and neighboring nodes, each node calculates transmission power levels and transmission data rates that minimize an air-time metric, wherein the air-time metric is dependent on the neighbor function and an air-time occupied by transmission packets. Each access node sets its transmission power level and data rate based on the calculated power levels and data rates.

Other aspects and advantages of the present invention will become apparent from the following detailed description, taken in conjunction with the accompanying drawings, illustrating by way of example the principles of the invention.

DETAILED DESCRIPTION

The invention includes a method and apparatus for characterizing transmission (power level and data rate) of a node within a wireless network. The characterization allows for selection of transmission power level and data rate to minimize an air-time metric of transmission of the node.

The transmission protocols of a wireless networks typically includes multiple possible transmission data rates. For example, the IEEE 802.11g standard specifies operating data rates including 1 Mbps, 2 Mbps, 5.5 Mbps, 6 Mbps, 9 Mbps, 11 Mbps, 12 Mbps, 18 Mbps, 24 Mbps, 36 Mbps, 48 Mbps and 54 Mbps. Successful transmission at the higher data rates requires higher levels of SNR (signal-to-noise ratio) at the receiver, typically requiring higher transmission signal power. However, the higher data rates typically require less transmission air-time per bit. Therefore, a trade-off typically exits in wireless networks between transmission power levels and data rates. The higher SNR required for higher data rates typically requires a higher transmission power level that is more likely to interfere with neighboring nodes. However, the higher data rates typically require less air-time per bit, and therefore, are typically friendly to neighboring nodes with respect to available air-time.

The following embodiment and descriptions are directed to wireless mesh network. However, it is to be understood that the embodiments are not limited to wireless mesh networks. Wireless networks in general can benefit from the methods of characterizing transmission power levels and transmission data rates described.

Figure 1:
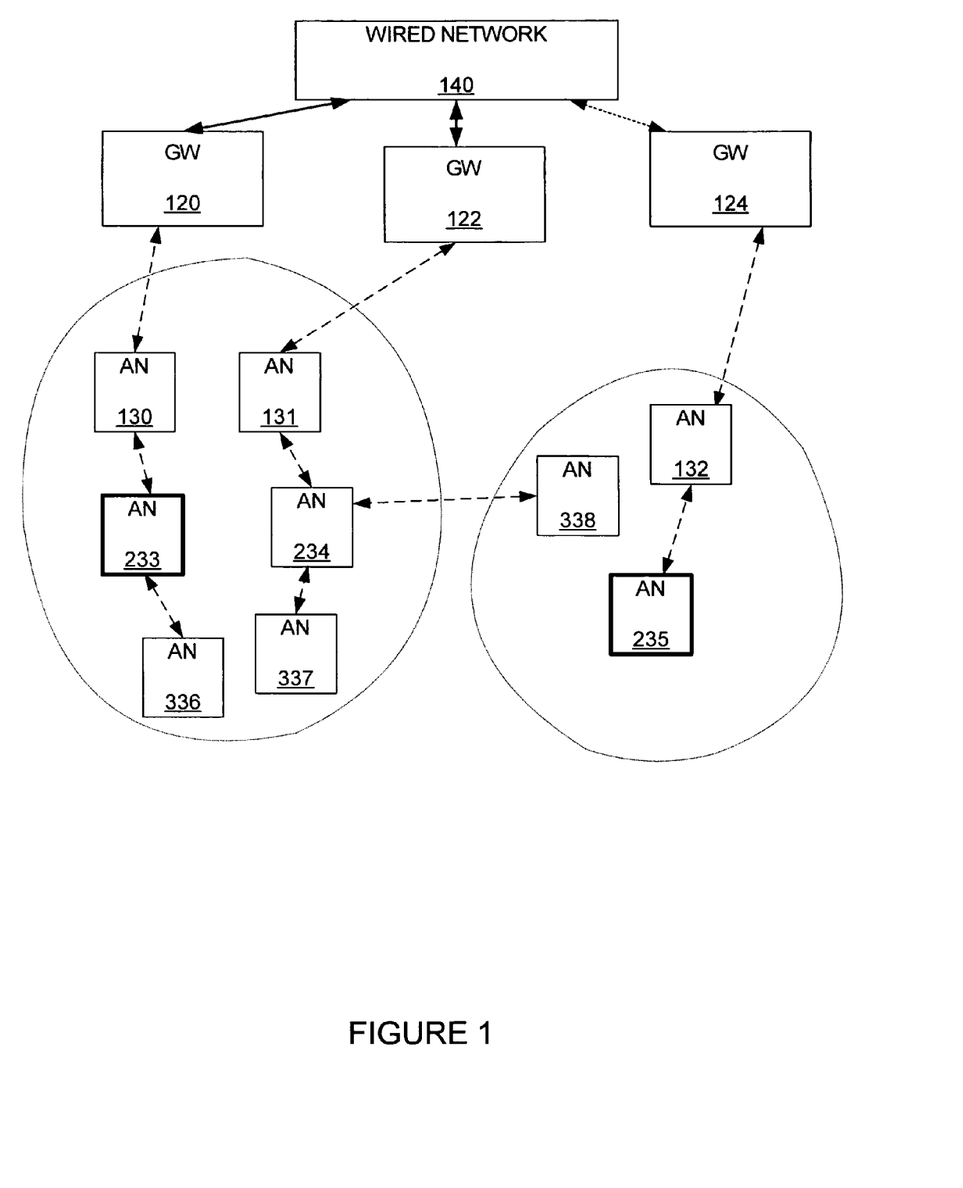
FIG. 1 shows a wireless mesh network that includes access nodes of varying distances from each other.

FIG. 1 shows a wireless mesh network with many access nodes. The wireless access nodes interconnect with each other, and gateways to form a mesh. The interconnections are wireless links, and therefore, the air-time occupied by each of the access nodes is important because there is only a finite amount of air-time available. Depending upon the physical locations of the access nodes, certain access nodes are more likely to interfere with other nodes of the wireless network. A first exemplary node 233 is more likely to interfere with neighboring nodes of the wireless mesh network than a second exemplary node 235, because the first node 233 is physically located closer to more neighboring nodes than the second node 235. Neighbor nodes can be defined as other nodes that can receive signals from a node at a predetermined amount of signal strength when the signals are transmitted from the node at another predetermined level of signal strength.

An embodiment of each of the access nodes of the wireless network includes determining a neighbor function for the access node. The neighbor function for each of the access nodes can be different depending upon how the access node is physically located with respect to the other access nodes of the wireless network. One exemplary method of determining the neighbor function includes determining how many neighboring nodes are affected by signals transmitted from the node at varying power levels. Assuming reciprocity in the transmission signal links, this can be determined by having nodes of the wireless network transmit signals of a predetermined power level. If the node receives the transmitted signals with a power level above another threshold, then the nodes transmitting the signals are designated as neighboring nodes. Effectively, the path losses of the links between the access nodes and the other nodes are determined. Nodes are designated as neighboring nodes if the path loss of the corresponding link is less than a threshold.

Medium access protocols such as 802.11 implement Carrier Sense Multiple Access with Collision Avoidance (CSMA/CA). In such protocols, transceivers sense a channel (link) and defer transmissions while the channel is considered to be busy. The channel is deemed to be busy if a received signal exceeds a Clear Channel Assessment Threshold (CCAT). One method of determining the neighbor function is to determine the transmission power level that would trip the CCAT of the neighboring nodes. Once the CCAT has been tripped, the nodes can no longer transmit any signals.

A neighbor function can easily be determined from the neighboring nodes once the path losses of the links between the node and the neighboring nodes are determined. At maximum transmission power, all of the neighbor nodes are affected. As the transmission power from the node is decreased, the number of affected nodes can be determined by knowing the path losses of each of the links between the node and the neighboring nodes.

Referring to FIG. 1, the first exemplary access node 233 can be determined to have neighboring nodes 130, 131, 234, 336, 337 when transmitting the predetermined power level. The number of neighboring nodes affected by transmission of the access node 233 decreases as the transmission power of the access node 233 decreases. The second exemplary access node 235 can be determined to have neighboring nodes 132, 338.

Figure 2:
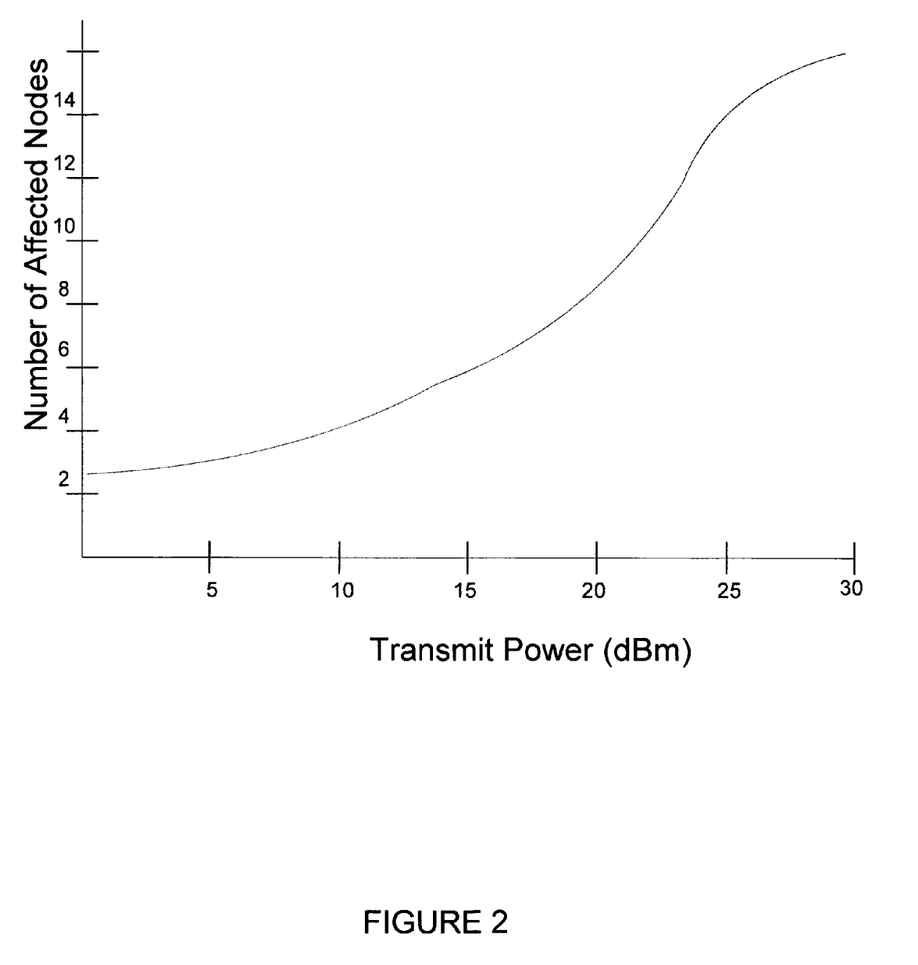
FIG. 2 is a plot of one example of a neighbor node function of one of the access nodes of the wireless mesh network.

FIG. 2 is a plot of one example of a neighbor node function of one of the access nodes of the wireless mesh network. It should be understood that this function varies from access node to access node depending on the number and the proximity of neighboring access nodes.

As would be expected, the number of other (neighboring) access nodes that are affected by the transmission from a particular access node increases as the transmission power increases. The shape of the curve (neighbor function) shown in FIG. 2 varies depending upon the locations of the neighboring nodes with respect to the particular access node.

The neighbor function is used by each access node to determine transmission power levels and data rates that minimize an air-time metric. For an exemplary embodiment, the air-time metric is dependent on the neighbor function and a percentage of air-time occupied. The air-time metric is typically calculated for a range of transmission path losses between the node and the neighboring nodes. The air-time (seconds per packet) is determined for each of the available data rates.

For an embodiment, the air-time metric (A) can be defined as a product of the time required to transmit a packet of data, and the neighboring nodes. That is, $A=T*N$, where T is the time required to transmit a packet (which is dependent on the data rate and order of modulation of the transmission signal, and the average number of retries to successfully transmit the packet), and where N is the number of neighboring nodes (which is dependent on the neighbor function, and the transmission power). For a calculated air-time metric, the packets are assumed to include a set number of bits. As will be described, the packets sizes can change (that is, include a different number of bits), but when calculating the air-time metric, the packet sizes are fixed. That is, a change in packet size requires a new air-time metric calculation.

Figure 3:
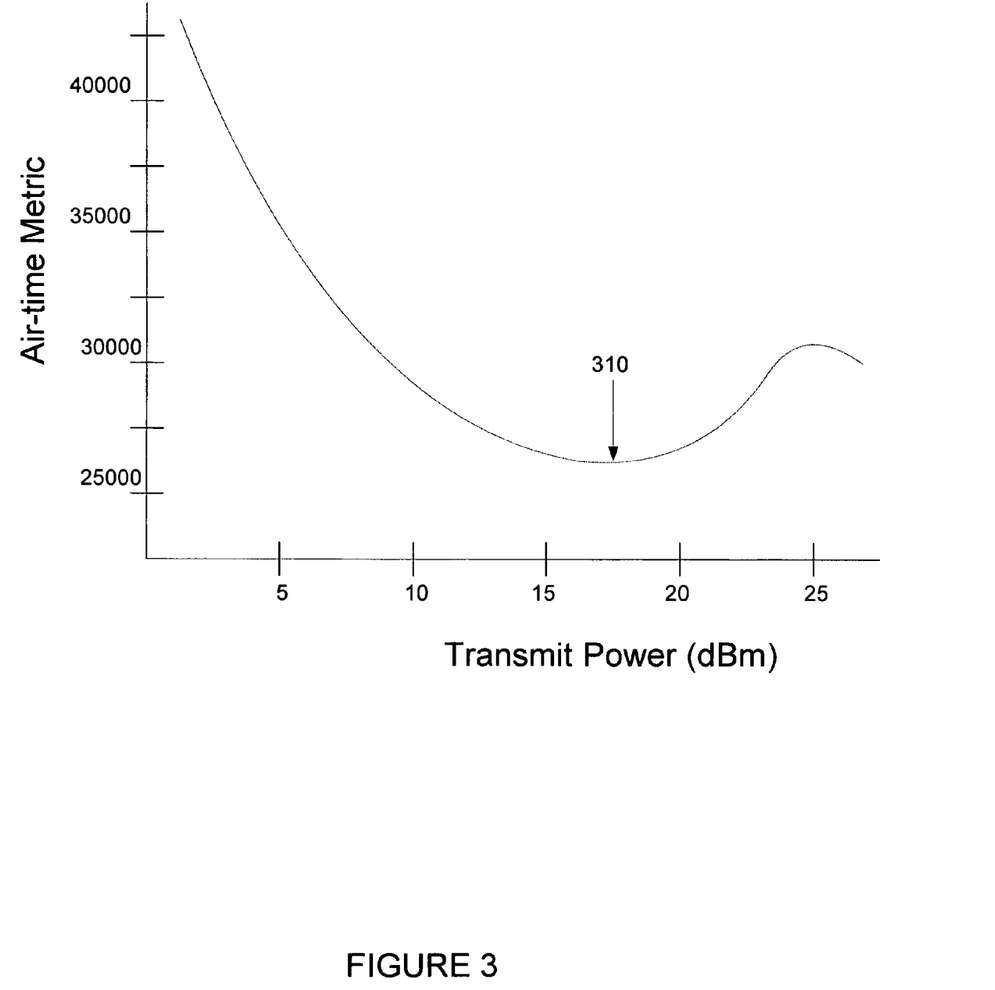
FIG. 3 is a plot of one example of air-time metric values versus transmission signal power for a particular quality transmission link.

FIG. 3 shows an exemplary representation of the air-time metric with a variation in the transmission power of a particular node. This representation is for a set quality of transmission link. For example, the air-time metric representation of FIG. 3 can be for a link having a path loss of, for example, 100 dB.

Generally, an optimal (or at least a near-optimal) transmission power can be determined for the particular link quality. For example, the point 310 as designated on FIG. 3 can be determined to be a near-optimal transmission power. The curve shows that increasing the transmission power level can improve the air-time metric (the increased transmission power provides an increasing SNR required for a higher data rate which results in less transmission time per packet) until a certain point in which the number of neighbors affected by the transmission starts to increase the air-time metric. The transmission power level and transmission data rate corresponding to the minimization (as shown, for example, as the point 310) of the air-time metric is typically selected as the desired transmission power level and transmission data rate for a particular transmission path quality.

Figure 4:
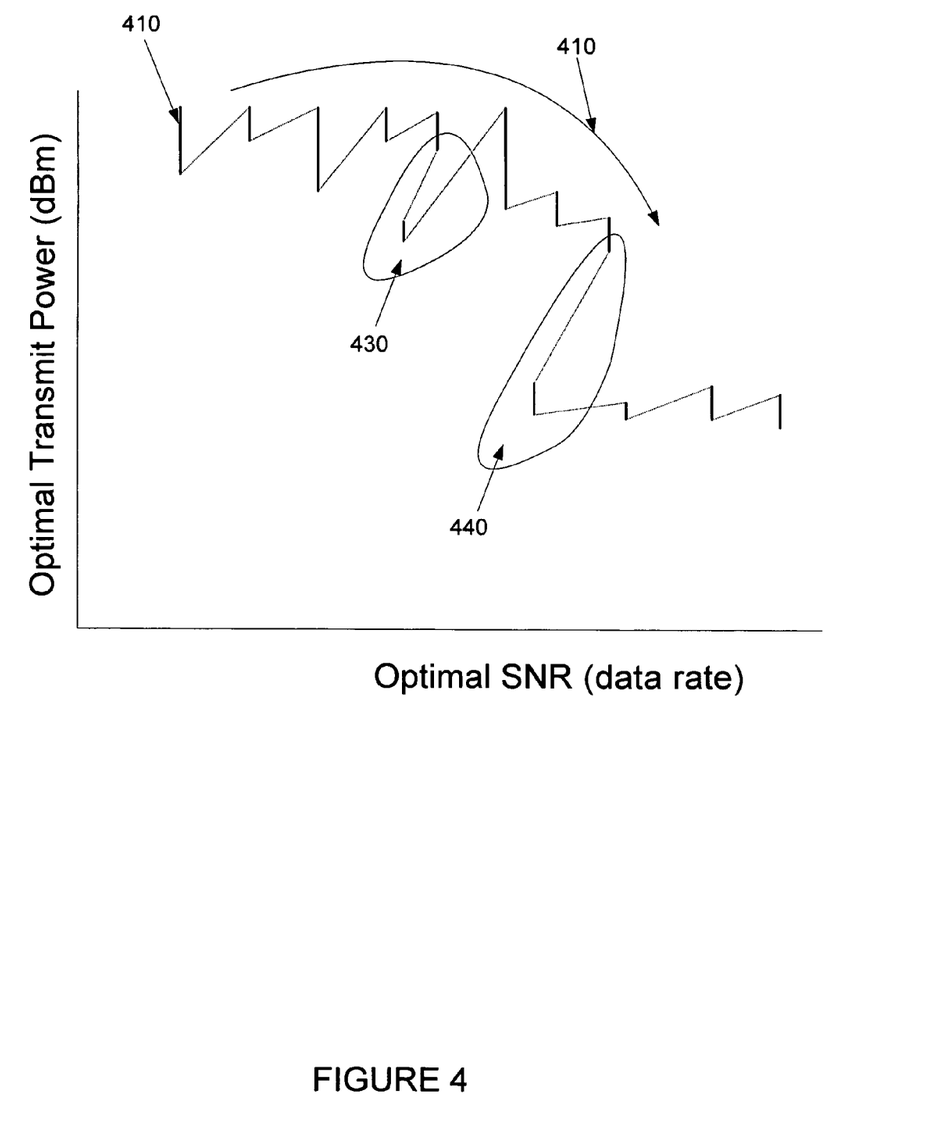
FIG. 4 is a plot of one example of a power-rate curve of the one access node of the wireless mesh network.

FIG. 4 is a plot of one example of a power-rate curve of the one access node of the wireless mesh network. The power-rate curve provides suggested transmission power levels and transmission data rates for a range of quality of transmission links. The upper-left portion 410 of the curve depicts the suggested transmission power level and data rate for the worst cased link quality. The worst-case link quality typically, but not always, corresponds to the longest link. The curve provides varying transmission power levels and transmission data rates that are calculated for use with progressively better links as indicated by arrow 420. The curve of FIG. 4 essentially provides a selection of transmission power level and transmission data rate that corresponds with the optimal (minimal, or at least near-minimal) air-time metric as shown in FIG. 3, for all of the possible transmission path qualities.

A power-rate curve similar to the power-rate curve of FIG. 4 can be generated for different packet sizes that include different numbers of data bits. Smaller-sized packets (fewer data bits) can have a greater probability of being successfully transmitted.

When an access node is transmitting to a particular neighboring node, the access node determines the approximate path loss between the access node and the target node and sets the transmission power level and data rate according to the calculated values as shown, for example, by FIG. 4.

The air-time metric accounts for both the number of affected neighboring nodes, and the transmission time per packet. The power-rate curve is generated based on the quality of the expected link while minimizing the air-time metric. Due to this inter-relationship between the transmission time per packet and the number of affected nodes, the power rate curve includes unique discontinuities, such as, those designated 430, 440. These discontinuities suggest that with a slightly better quality link, the air-time metric is improved by decreasing the transmission power level, and decreasing the transmission data rate. This typically occurs because a slight decrease in the transmission power level causes a significant change in the number of affected neighbors.

Figure 5:
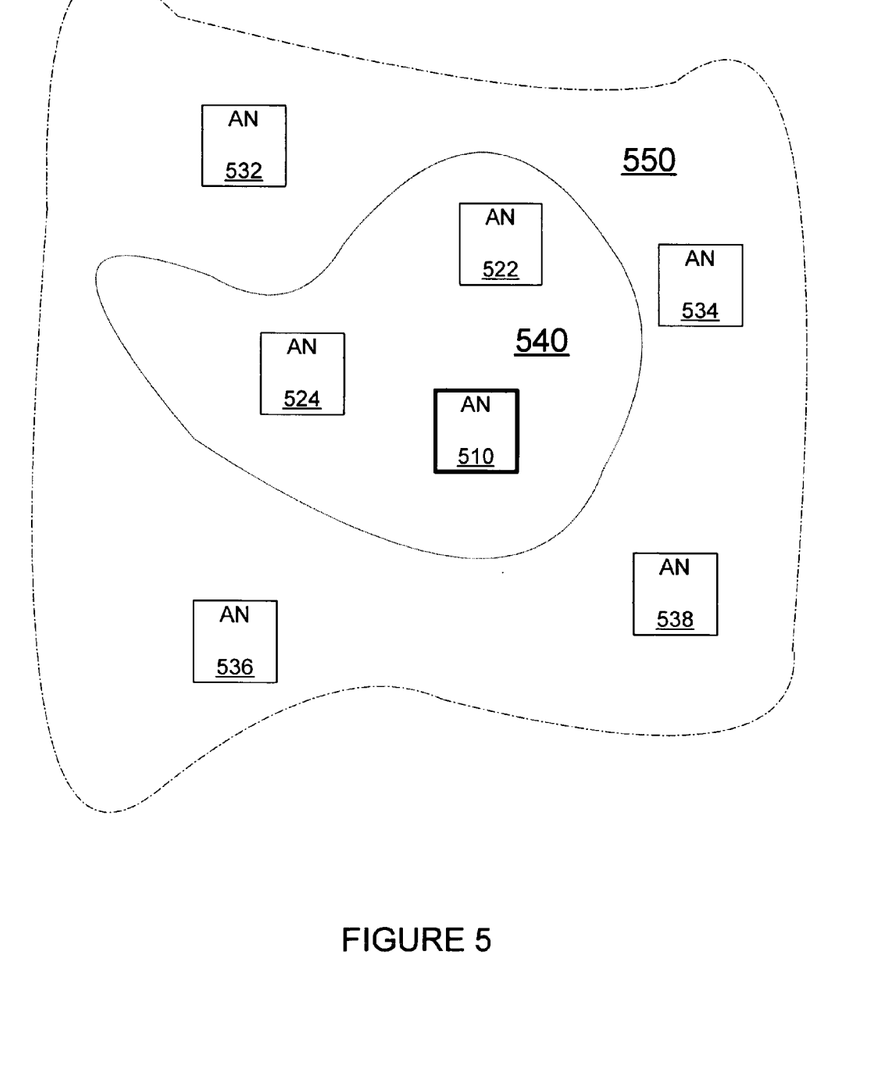
FIG. 5 shows and access node and neighboring access nodes for varying levels of transmission signal power.

FIG. 5 shows a particular access node 510 and neighboring nodes 522, 524, 532, 534, 536, 538 that can be used to provide a better understanding of the existence of the discontinuities 430, 440 of the power-rate curve of FIG. 4. The range of the transmission for a first transmission signal power level from the access node 520 can be shown by the range 540, and the transmission affects, for example, only a couple of neighboring access nodes 522, 524. By increasing the transmission power level to cover a range as depicted by 550, several other access nodes 532, 534, 536, 538 are affected by the transmission signals of the access node 510. Therefore, although the increased transmission signal power may support a higher data rate which could work to decease the value of the air-time metric, the number of neighboring nodes affected by the increased transmission power level increases the air-time metric more than the increased data rate decreases the air-time metric. Therefore, the discontinuities 430, 440 of the power rate curve of FIG. 4 exist because decreasing the transmission power level and the transmission data rate can, at times, decrease the air-time metric.

Figure 6:
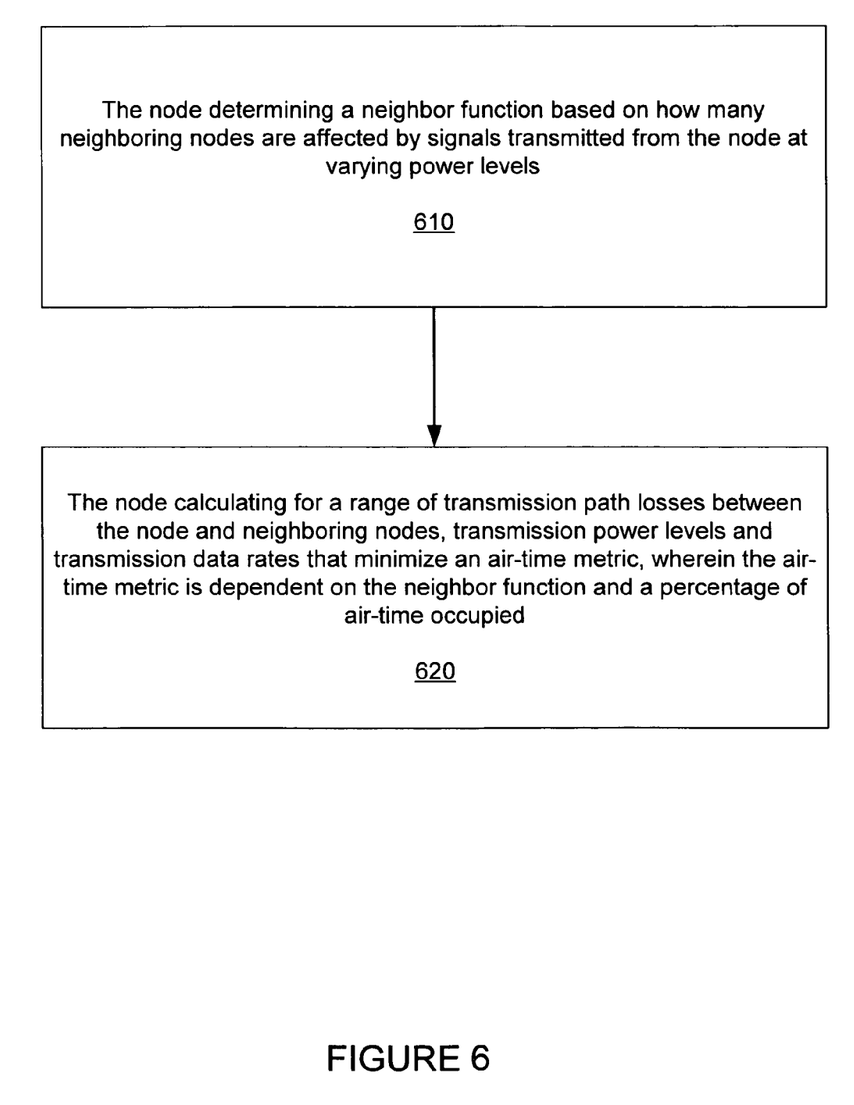
FIG. 6 is a flow chart showing one example of steps included within a method of characterizing transmission of a node of a wireless network.

FIG. 6 is a flow chart showing one example of steps included within a method of characterizing transmission of a node of a wireless network. A first step 610 includes determining a neighbor function based on how many neighboring nodes are affected by signals transmitted from the node at varying power levels. A second step 620 includes calculating for a range of transmission path losses between the node and neighboring nodes, transmission power levels and transmission data rates that minimize an air-time metric, wherein the air-time metric is dependent on the neighbor function and a percentage of air-time occupied.

Neighbor Function

The neighbor function provides a representation of how many other access nodes of the wireless network are affected by an access node as a function of the power level of a signal transmitted from the access node. The neighbor function can be determined by determining the path loss between the access node and other access nodes of the wireless network. As previously described, one method of determining the path loss is to measure the signal strength at the access node of signals transmitted from the other access nodes at a predetermined level. Assuming reciprocity in the transmission paths, the neighbor function can be determined calculating the power level of signals received at each of the other nodes by subtracting the path loss from signals transmitted from the access node.

Air-Time Metric

As previously described, an exemplary embodiment of the air-time metric is dependent on the neighbor function and a percentage of air-time occupied. The air-time metric is typically calculated for a range of transmission path losses between the node and the neighboring nodes.

For an embodiment, the air-time metric (A) can be defined as a product of the time required to transmit a packet of data, and the neighboring nodes. That is, $A=T*N$, where T is the time required to transmit a packet (which is dependent on the data rate and order of modulation of the transmission signal), and where N is the number of neighboring nodes (which is dependent on the neighbor function, and the transmission power).

For one embodiment the air-time occupied is estimated based on a transmission packet air-time. For another embodiment the air-time occupied is estimated based on a percentage of air-time which is determined by the number of packets transmitted during a period of time.

For one embodiment the air-time metric is determined by multiplying a packet transmission time by a number of neighbors that can receive the signal transmitted at the predetermined power level. For another embodiment, the air-time metric is determined by multiplying a number of packets transmitted during a period of time by a number of neighbors that can receive the signal transmitted at the predetermined power level.

An access node of a wireless network can set its transmission power level and transmission data rate for a target neighbor node based on a path loss between the node and the target node. The path loss can be used to estimate the link (path) quality between the access node and the target node. From the power level and data rate curve, the desired transmission power level and transmission data rate can be determined.

Figure 7:
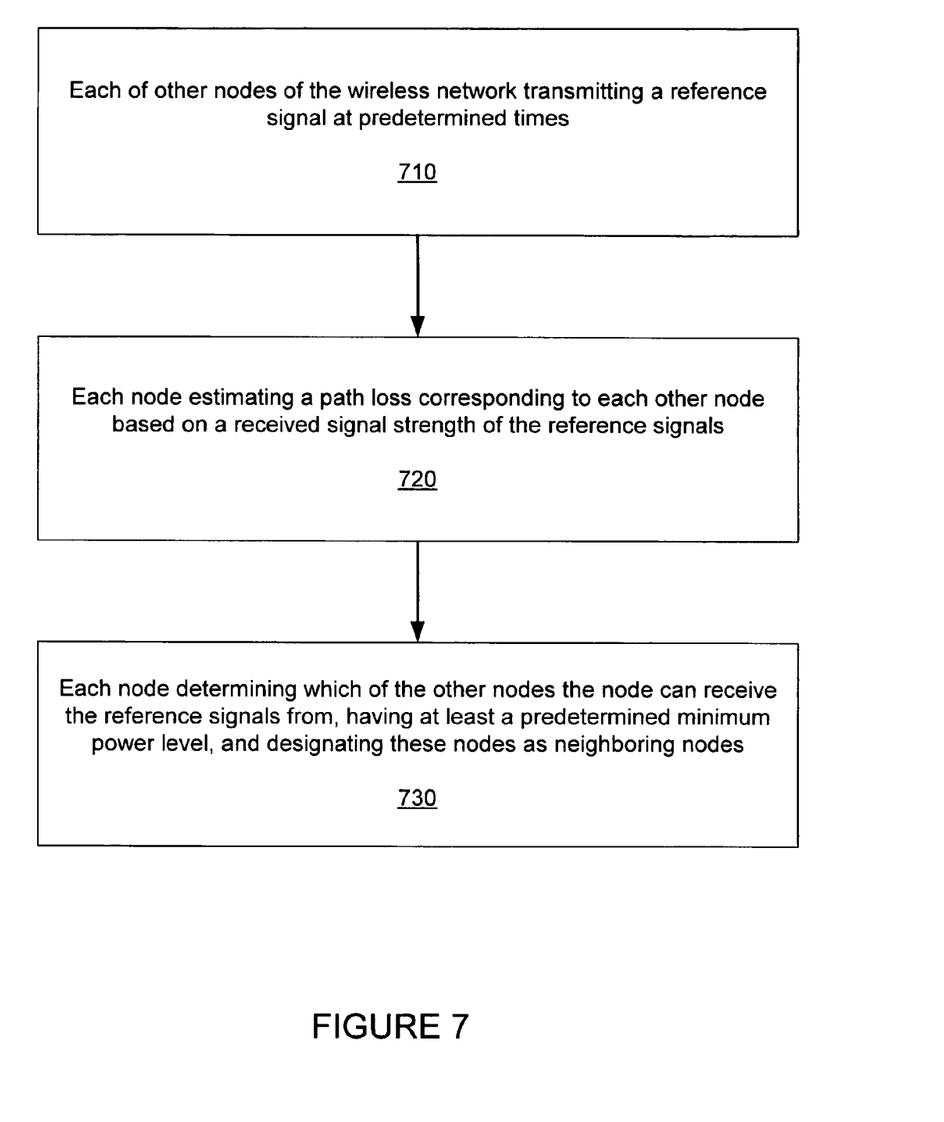
FIG. 7 is a flow chart showing one example of steps included within a method of setting transmission power levels and data rates of a node within a wireless mesh network.

FIG. 7 is a flow chart showing one example of steps included within a method of setting transmission power levels and data rates of a node within a wireless mesh network. A first step 710 includes each node determining a neighbor function based on how many neighboring nodes are affected by a signal transmitted from the corresponding node at a predetermined power level. A second step 720 includes each node calculating for a range of transmission path losses between the node and neighboring nodes, transmission power levels and transmission data rates that minimize an air-time metric, wherein the air-time metric is dependent on the neighbor function and an air-time occupied by transmission packets. A third step 730 includes each access node setting its transmission power level and data rate based on the calculated power levels and data rates.

Various methods can be used to determine how many neighboring nodes are affected by signals from the node. One method includes each of the other nodes of the wireless network transmitting reference signals at predetermined times. Each node estimating a path loss corresponding to each other node based on received signal strength of the reference signals. Each node determines which of the other nodes the node can receive the reference signals from, having at least a predetermined minimum power level, and designating these nodes as neighboring nodes.

The described methods of determining access node transmission power levels and data rates can be implemented as computer programs that are operable on the access node. Executing the computer program causes the access node to execute the steps of the described methods.

Although specific embodiments of the invention have been described and illustrated, the invention is not to be limited to the specific forms or arrangements of parts so described and illustrated. The invention is limited only by the appended claims.

What is claimed:

1. A method of characterizing joint combinations of transmission power levels and transmission data rates of an access node of a wireless network, comprising:

identifying neighboring access nodes of the access node based on path losses of corresponding links between the access node and the neighboring access nodes;

the access node determining a neighbor function based on how many of the identified neighboring access nodes are affected by signals transmitted from the access node at varying power levels;

the access node calculating for a range of transmission path losses between the access node and neighboring access nodes, combinations of transmission power levels and transmission data rates that jointly minimize an air-time metric, wherein the air-time metric is dependent on the neighbor function and an air-time occupied by transmission packets; wherein the air-time metric is further determined by multiplying a transmit time of a set number of bits by a number of identified neighboring access nodes that can receive the signal transmitted at the predetermined power level.

2. The method of claim 1, wherein calculating an expected range of transmission path losses between the access node and identified neighboring access nodes, transmission power levels and transmission data rates comprises calculating a transmission power level and transmission data rate for multiple values of expected transmission path loss.

3. The method of claim 1, wherein the air-time occupied is determined by a percentage of air-time occupied.

4. The method of claim 1, wherein determining how many neighboring access nodes are affected by a signals from the access node comprises:

other access nodes of the wireless network transmitting a reference signal at predetermined times;

the access node determining which of the access nodes the access node can receive the reference signals from, having at least a predetermined minimum power level, and designating these access nodes as neighboring access nodes.

5. The method of claim 4, further comprising the access node estimating a path loss corresponding to each neighboring access node.

6. The method of claim 1, wherein the percentage of air-time occupied is estimated based on a transmission packet air-time.

7. The method of claim 1, wherein the percentage of air-time occupied is estimated based on a number of packets transmitted during a period of time.

8. The method of claim 1, wherein the air-time metric is determined by multiplying a number of packets transmitted during a period of time by a number of neighboring access nodes that can receive the signal transmitted at the predetermined power level.

9. The method of claim 1, further comprising the access node setting a transmission power level and transmission data rate for transmission to a target neighbor access node based on a path loss between the access node and the target node, and the calculated transmission power levels and data rates.

10. The method of claim 9, wherein the access node and the target access node comprises at least one of an access point, a gateway.

11. The method of claim 9, wherein the transmission power and data rate are set for each data packet transmitted.

12. The method of claim 9, wherein the access node periodically checks different calculated transmission power levels and data rates to determine if a different combination provides a better link.

13. The method of claim 9, wherein the access node periodically checks different calculated transmission power levels and data rates to determine if a different combination provides a link that provides a better air-time metric.

14. The method of claim 9, wherein if an error rate of transmitted data is above a threshold, the access node increases the transmission power level or decreases the transmission data rate according to the calculated transmission power levels and data rates combinations.

15. The method of claim 9, wherein if an error rate of transmitted data is below a threshold, the access node decreases the transmission power level or increases the transmission data rate according to the calculated transmission power levels and data rates combinations.

16. A method of setting joint combinations of transmission power levels and data rates of access nodes within a wireless mesh network, comprising:

identifying neighboring access nodes of the access node based on path losses of corresponding links between the access node and the neighboring access nodes;

each access node determining a neighbor function based on how many identified neighboring access nodes are affected by signals transmitted from the access node at varying power levels;

each access node calculating for a range of transmission path losses between the access node and neighboring access nodes, combinations of transmission power levels and transmission data rates that jointly minimize an air-time metric, wherein the air-time metric is dependent on the neighbor function and a percentage of air-time occupied; wherein the air-time metric is further determined by multiplying a transmit time of a set number of bits by a number of identified neighboring access nodes that can receive the signal transmitted at the predetermined power level; and each access node setting its transmission power level and data rate based on the calculated power levels and data rates.

17. The method of claim 16, wherein determining how many neighboring access nodes are affected by a signals from the access node comprises:

each of identified neighboring access nodes of the wireless network transmitting a reference signal at predetermined times;

each access node estimating a path loss corresponding to each identified neighboring access node based on a received signal strength of the reference signals;

each access node determining which of the identified neighboring access nodes the access node can receive the reference signals from, having at least a predetermined minimum power level, and designating these access nodes as neighboring access nodes.

18. The method of claim 16, wherein the percentage of air-time occupied is estimated based on a transmission packet air-time.

19. The method of claim 16, wherein the percentage of air-time occupied is estimated based on a number of packets transmitted during a period of time.

* * * * *